(12) United States Patent
Hsu et al.

(10) Patent No.: US 12,379,550 B2
(45) Date of Patent: Aug. 5, 2025

(54) FIBER OPTIC ADAPTER

(71) Applicants: Gloriole Electroptic Technology Corp., Kaohsiung (TW); SHEN ZHEN WONDERWIN TECHNOLOGY CO., LTD., Shenzhen (CN)

(72) Inventors: Hsien-Hsin Hsu, Kaohsiung (TW); Wu-Li Chu, Kaohsiung (TW); Yen-Chang Lee, Kaohsiung (TW); Shu-Bin Li, Shenzhen (CN)

(73) Assignees: GLORIOLE ELECTROPTIC TECHNOLOGY CORP., Kaohsiung (TW); SHEN ZHEN WONDERWIN TECHNOLOGY CO., LTD., Shenzhen (CN)

( * ) Notice: Subject to any disclaimer, the term of this patent is extended or adjusted under 35 U.S.C. 154(b) by 355 days.

(21) Appl. No.: 18/083,161

(22) Filed: Dec. 16, 2022

(65) Prior Publication Data

US 2024/0036265 A1 Feb. 1, 2024

(30) Foreign Application Priority Data

Jul. 27, 2022 (TW) ................................ 111208039

(51) Int. Cl.
*G02B 6/38* (2006.01)
(52) U.S. Cl.
CPC ......... *G02B 6/3825* (2013.01); *G02B 6/3849* (2013.01); *G02B 6/3879* (2013.01)
(58) Field of Classification Search
CPC ... G02B 6/3825; G02B 6/3849; G02B 6/3879
See application file for complete search history.

(56) References Cited

U.S. PATENT DOCUMENTS

| | | | | |
|---|---|---|---|---|
| 6,004,043 A | * | 12/1999 | Abendschein | G02B 6/3825 385/76 |
| 6,685,362 B2 | * | 2/2004 | Burkholder | G02B 6/3849 439/607.34 |
| 7,785,018 B2 | * | 8/2010 | Jones | G02B 6/3849 385/94 |

(Continued)

FOREIGN PATENT DOCUMENTS

| | | |
|---|---|---|
| TW | 462499 U | 11/2001 |
| TW | 201945778 A | 12/2019 |

*Primary Examiner* — Daniel Petkovsek
(74) *Attorney, Agent, or Firm* — MUNCY, GEISSLER, OLDS & LOWE, P.C.

(57) ABSTRACT

A fiber optic adapter includes an outer housing, a receiving seat, and a blocking mechanism. The outer housing defines two connection slots. The receiving seat is connected detachably to the outer housing, and defines two through grooves respectively in spatial communication with the connection slots. The blocking mechanism includes a pivot shaft, a torsion spring sleeved on the pivot shaft, and two cover plates connected pivotally to the pivot shaft and respectively connected to two opposite ends of the torsion spring. When each cover plate is in a blocking position, the cover plate blocks a respective connection slot, and is inclined relative to a central axis of the respective connection slot with a free end thereof being more towards the rear than the pivot shaft, and with an angle that is defines between the cover plate and the central axis being not a right angle.

7 Claims, 10 Drawing Sheets

(56) References Cited

U.S. PATENT DOCUMENTS

| | | | | |
|---|---|---|---|---|
| 8,186,890 B2 * | 5/2012 | Lu | ........................ | G02B 6/3879 |
| | | | | 385/139 |
| 9,196,997 B2 * | 11/2015 | Sanders | ............... | G02B 6/3825 |
| 9,453,963 B2 * | 9/2016 | Sato | ........................ | G02B 6/241 |

* cited by examiner

FIBER OPTIC ADAPTER

CROSS-REFERENCE TO RELATED APPLICATION

This application claims priority to Taiwanese Utility Model patent application No. 111208039, filed on Jul. 27, 2022.

FIELD

The disclosure relates to a fiber optic adapter, and more particularly to a fiber optic adapter having a security function of light blocking and a dustproof function.

BACKGROUND

An optical fiber is an optical communication path that conducts signal transmission through a high-intensity beam. When it is desired to couple between the optical fibers, a fiber optic connector which is provided with an optical fiber can be inserted into a connection slot of a fiber optic adapter, and mate with a fiber optic connector which is provided with another fiber optic and which is inserted into an opposite end of the fiber optic adapter, so that a light beam can be transmitted between the optical fibers. However, when only one fiber optic connector is connected on the fiber optic adapter, the high intensity beam emitted by the fiber optic connector will pass through the connection slot, and emit outwards at the opposite end of the fiber optic adapter. When the user looks at the connection slot, the user's eyes can easily be directly injured by the high intensity light beam. Furthermore, the optical fibers are often installed in a less clean and dusty environment. When dust is introduced into the fiber optic adapter, it often causes damage to the terminal of the fiber optic connector, and cause loss of power in the optical path.

Referring to FIG. 1, in order to prevent the above situation from occurring, a conventional fiber optic adapter 1 has currently been provided with an operable flip cover 11. When only one fiber optic connector (not shown in FIG. 1) is inserted into the fiber optic adapter 1, the flip cover 11 will cover a pair of empty slots 12 (only one is visible in FIG. 1) to block light beams, thereby preventing the high intensity light beam from emitting outward. And when another fiber optic connector (not shown in FIG. 1) needs to insert into the slots 12, the flip cover 11 is manually opened to expose the slots 12, thereby allowing the another fiber optic connector to be inserted into the slots 12. However, such a design requires the user to manually open and close the flip cover 11, therefore it is troublesome in operation. In addition, because the flip cover 11 is perpendicular to the beam path, light beams emitted by the optical fibers may be reflected back along the same light path when blocked. The signal noises of this reverse transmission are likely to result in instability of the optical signal transmitter, thereby resulting in lower signal transmission quality.

Referring to FIG. 2, in order to resolve the complexity of operation, another conventional fiber optic adapter 2 is equipped with a curved metal stop plate 21. When a fiber optic connector 22 is not inserted into the conventional fiber optic adapter 2, the metal stop plate 21 blocks the corresponding slot 23. When the fiber optic connector 22 is inserted, the inserted fiber optic connector 22 will push aside the metal stop plate 21 via elasticity of the metal stop plate 21. Although such a design can simplify the operation, the metal material of the metal stop plate 21 is prone to generating a greater amount of reflection, which is not suitable for high-resolution communication. The metal stop plate 21 is prone to breakage due to metal fatigue after multiple deformations, resulting in a short life of the fiber optic adapter 2. Furthermore such a light path blocking method doesn't achieve the effect of preventing dust ingress.

SUMMARY

Therefore, an object of the disclosure is to provide a fiber optic adapter that can alleviate at least one of the drawbacks of the prior art.

According to the disclosure, the fiber optic adapter includes an outer housing, a receiving seat, and a blocking mechanism. The outer housing defines two connection slots that extend in a front-rear direction, and that are parallel to and spaced apart from each other. The receiving seat is connected detachably to a front end of the outer housing, and defines two through grooves that are respectively in spatial communication with the connection slots. The blocking mechanism is mounted on the receiving seat, and includes a pivot shaft that is mounted on the receiving seat and between the through grooves, a torsion spring that is sleeved on the pivot shaft, and two cover plates that are connected pivotally to the pivot shaft and that are respectively connected to two opposite ends of the torsion spring. Each of the cover plates is pivotable about the pivot shaft against a resilient force of the torsion spring from a blocking position to an open position relative to the receiving seat. When each of the cover plates is in the blocking position, the cover plate blocks a respective one of the connection slots, and is inclined relative to a central axis of the respective one of the connection slots with a free end of the cover plate that is distal from the pivot shaft being more towards the rear than the pivot shaft, and with an angle that is defines between the cover plate and the central axis being not a right angle. When each of the cover plates is in the open position, the cover plate is retracted backward and inward to be parallel to the central axis of the respective one of the connection slots and unblocks the respective one of the connection slots.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
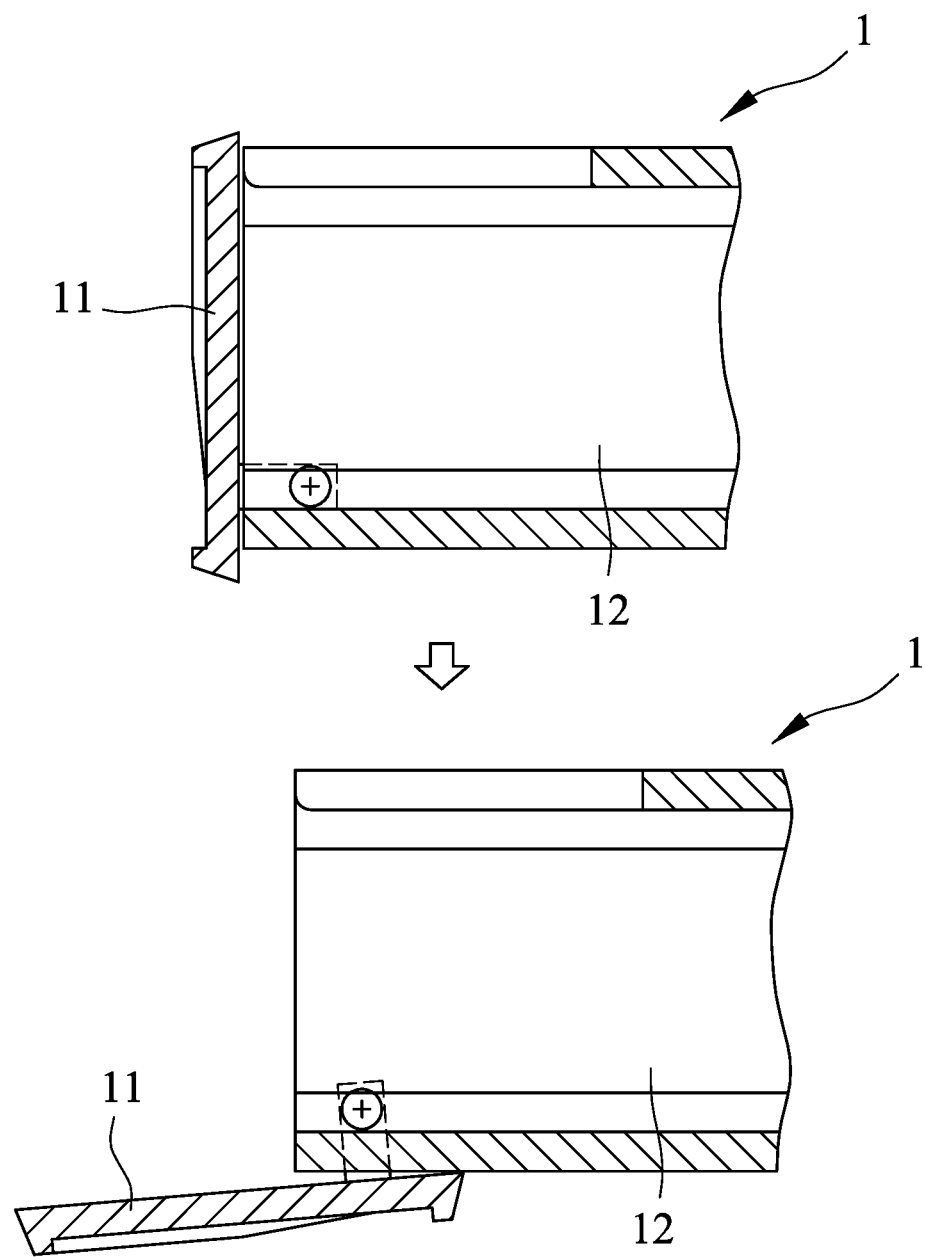
FIG. 1 is a schematic sectional view illustrating a conventional fiber optic adapter with a flip cover design.
Figure 2:
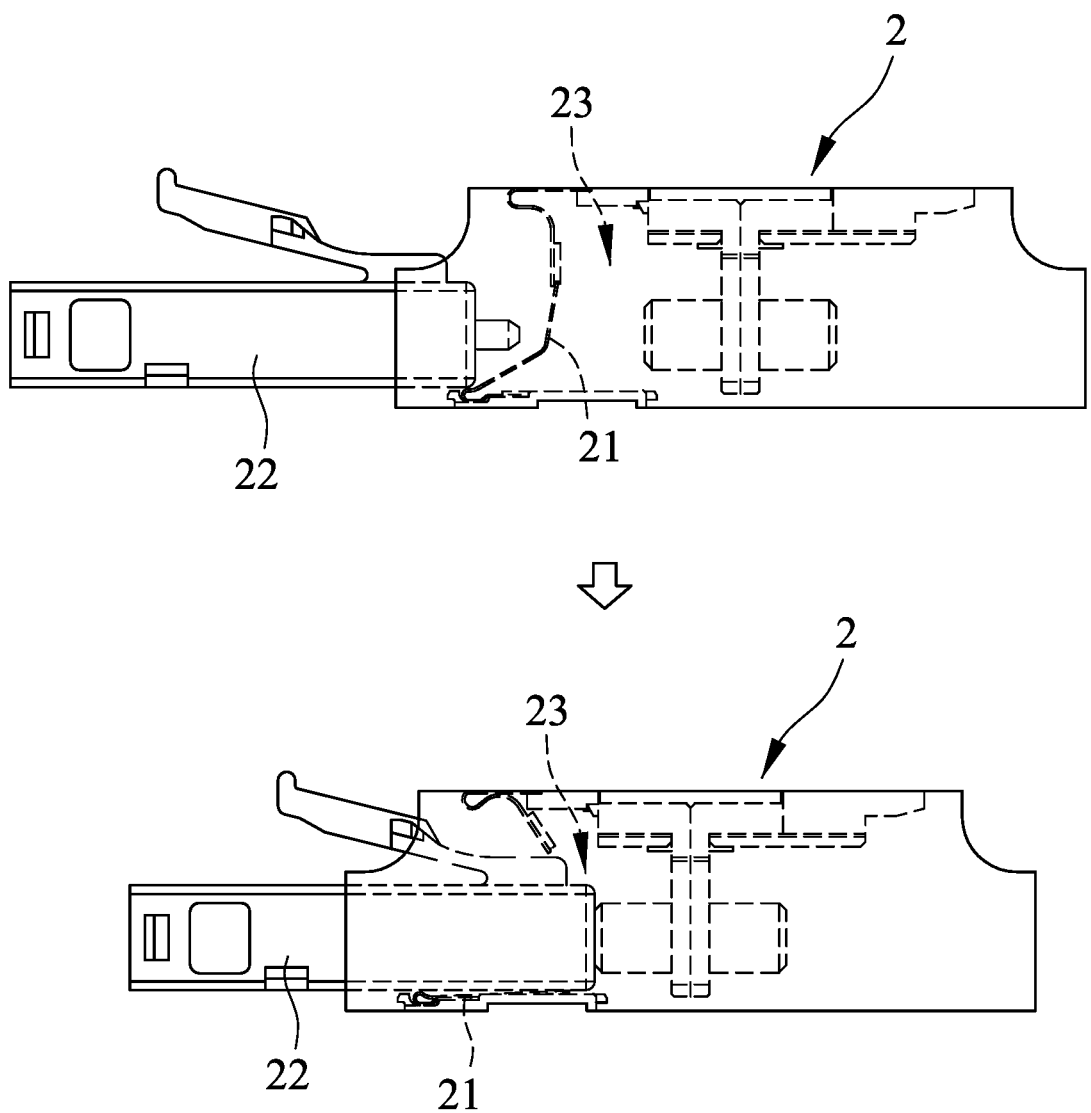
FIG. 2 is a schematic view of a conventional fiber optic adapter with a metal stop plate design.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
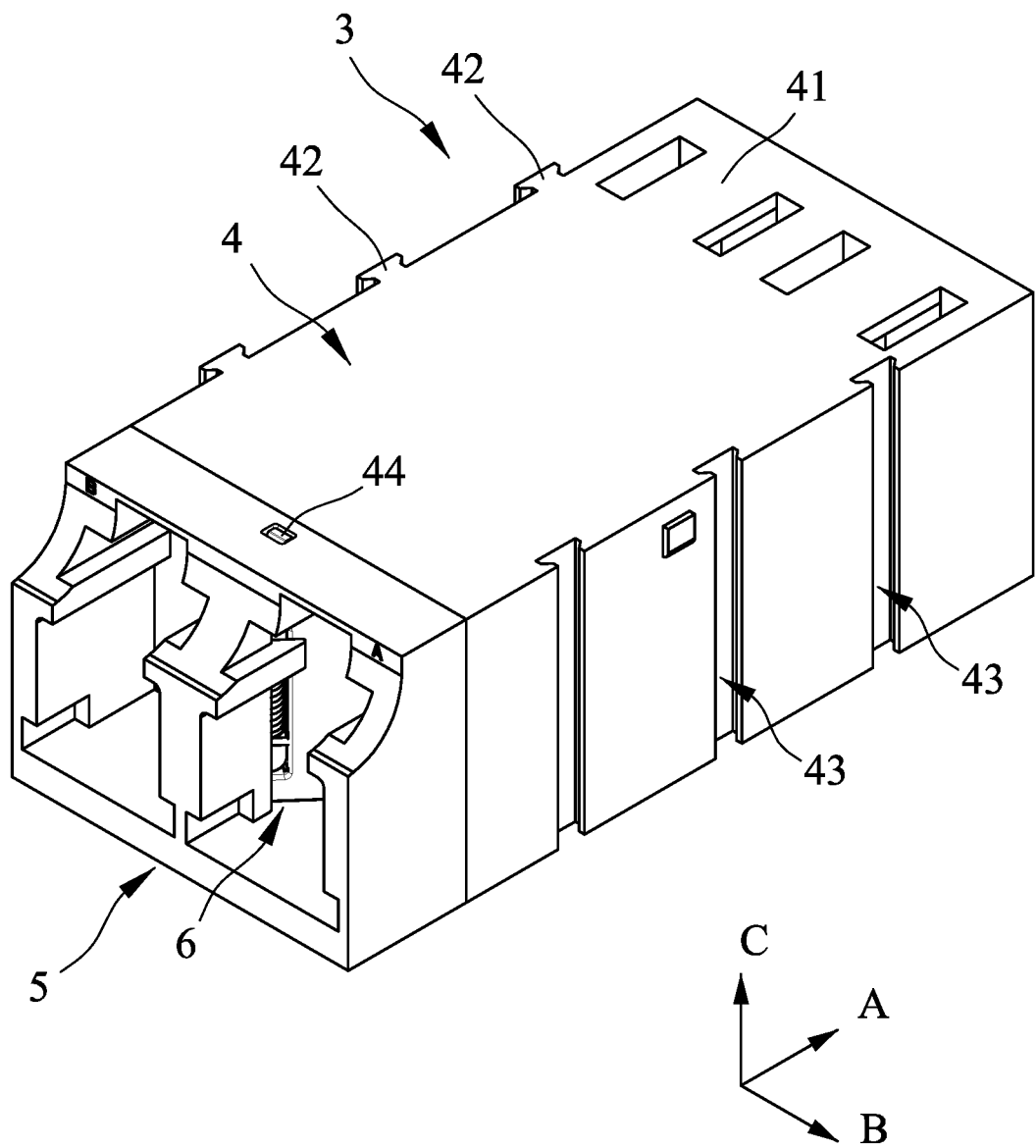
FIG. 3 is a perspective view of an embodiment of a fiber optic adapter according to the present disclosure.
Figure 4:
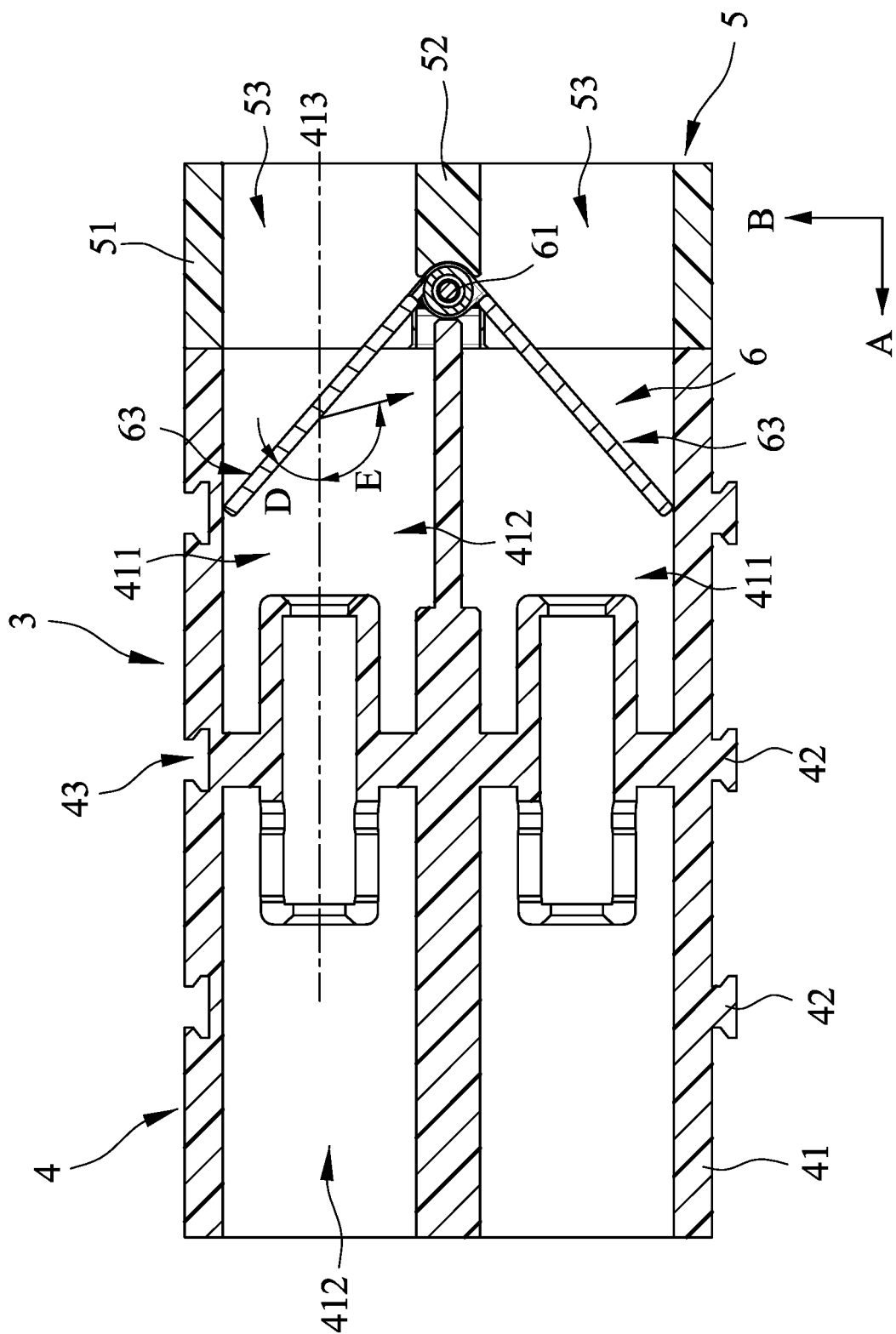
FIG. 4 is a sectional top view of FIG. 3.
Figure 5:
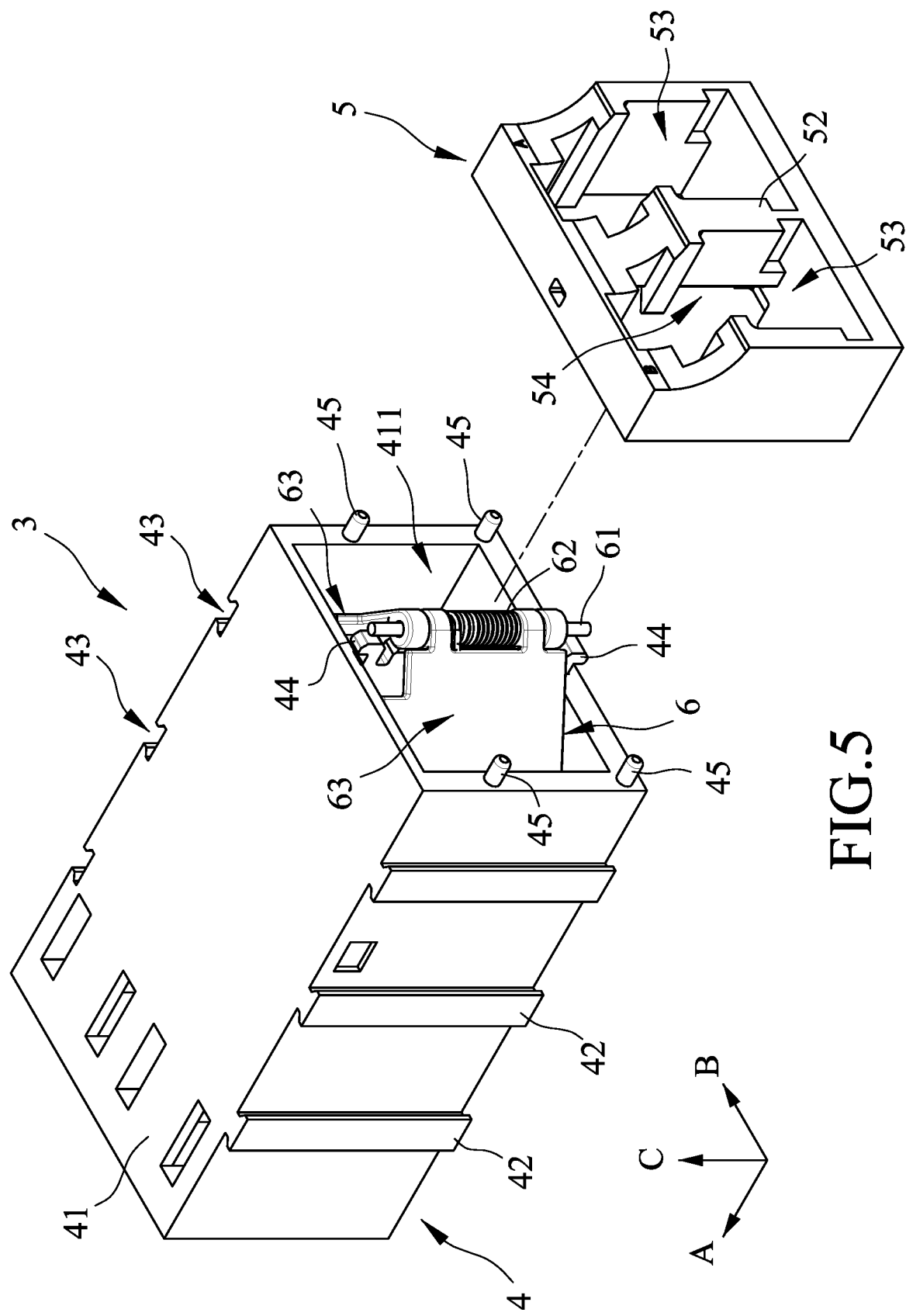
FIG. 5 is a partly exploded perspective view of the embodiment, illustrating a receiving seat being detached.

Referring to FIGS. 3, 4, and 5, a front-rear direction (A), a horizontal direction (B) perpendicular to the front-rear direction (A), and an up-down direction (C) perpendicular to both the front-rear direction (A) and the horizontal direction (B) are first defined. According to one embodiment of the present disclosure, a fiber optic adapter 3 includes an outer housing 4 extending in the front-rear direction (A), a receiving seat 5 connected detachably to a front end of the outer housing 4, and a blocking mechanism 6 mounted on the receiving seat 5. The outer housing 4 includes a housing portion 41, a plurality of lateral tenon portions 42, a plurality of lateral mortise portions 43, two front tenon portions 44, and four front plug portions 45. The housing portion 41 extends in the front-rear direction (A), and has opposite lateral sides in the horizontal direction (B). The lateral tenon portions 42 protrude from one of the lateral sides of the housing portion 41. The lateral mortise portions 43 are formed in the other one of the lateral sides of the housing portion 41. The front tenon portions 44 protrude forward from a front end of the housing portion 41, and are spaced apart from each other in the up-down direction (C). The front plug portions 45 protrude forward from a front end of the housing portion 41, and are located at the two opposite sides of the front tenon portions 44 in the horizontal direction (B). The housing portion 41 defines two parallel connection slots 411 that extend and are elongated in the front-rear direction (A), and that are spaced apart from each other in the horizontal direction (B). Each of the connection slots 411 is divided, via an internal partition of the housing portion 41, into two connection areas 412 in the front-rear direction (A) that communicate with each other through a communication hole in the internal partition. The lateral tenon portions 42 are spaced apart from each other in the front-rear direction (A), and each of the lateral tenon portions 42 is elongated in the up-down direction (C). In this embodiment, each of the lateral tenon portions 42 is of a dovetail tongue shape. The lateral mortise portions 43 are also spaced apart from each other in the front-rear direction (A), and each of the lateral mortise portions 43 is elongated in the up-down direction (C). In this embodiment, each of the lateral mortise portions 43 is of a dovetail groove shape. The lateral tenon portions 42 and the lateral mortise portions 43 are used to connect to the lateral tenon portions 42 and the lateral mortise portions 43 of other fiber optic adapters 3, in a manner that the lateral tenon portions 42 are inserted respectively into the lateral mortise portions 43 of another fiber optic adapter 3 in the up-down direction (C), and that the lateral mortise portions 43 are inserted respectively into the lateral tenon portions 42 of another fiber optic adapter 3, so as to firmly combine the outer housings 4 of the fiber optic adapters 3.

Figure 6:
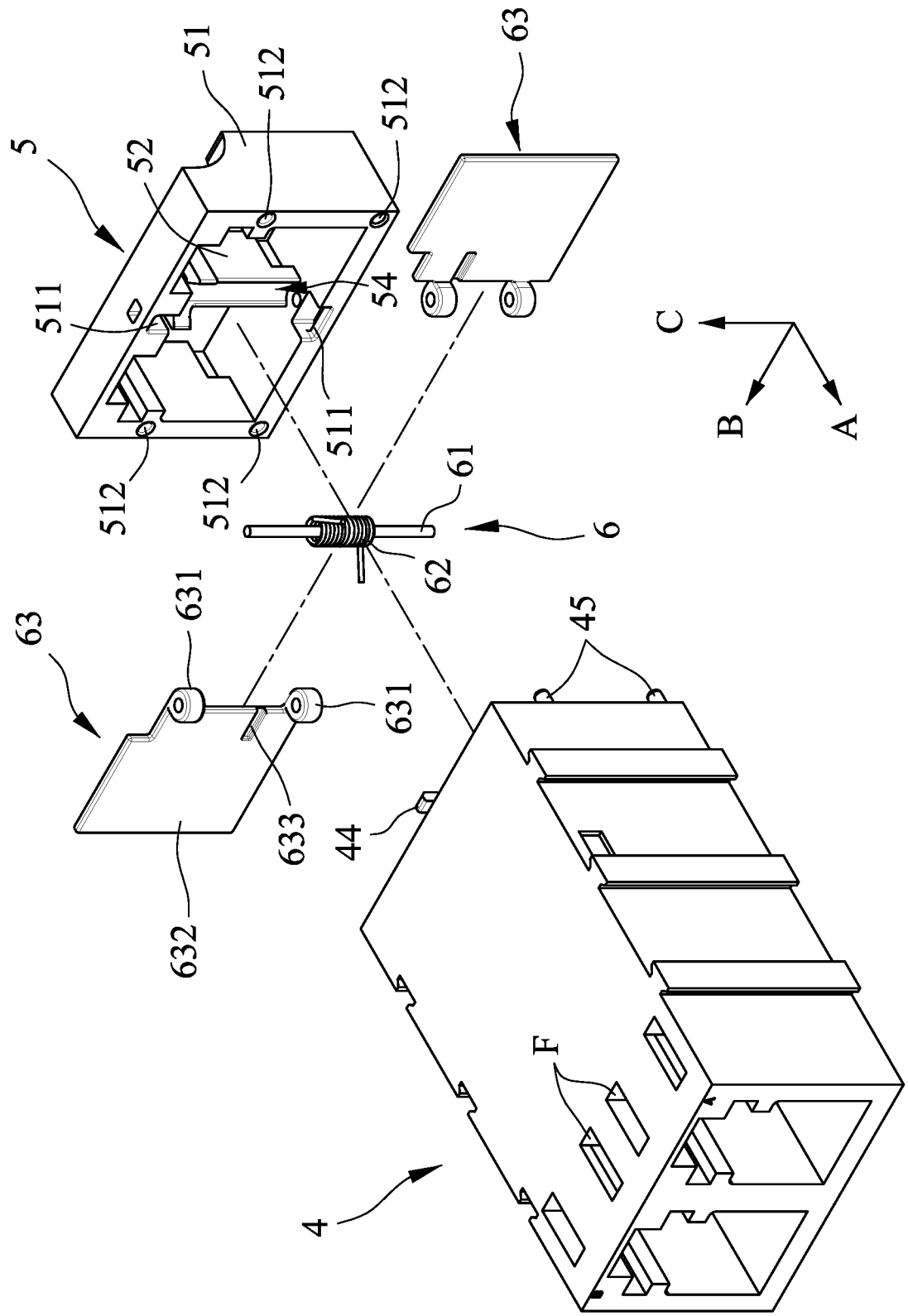
FIG. 6 is an exploded perspective view of the embodiment.

Referring to FIGS. 4, 5, and 6, the receiving seat 5 includes a surrounding wall portion 51, and a partition wall portion 52 disposed in the surrounding wall portion 51 and extending in the up-down direction (C). The space surrounded by the surrounding wall portion 51 is divided by the partition wall portion 52 into two through grooves 53 extending in the front-rear direction (A) and being respectively in spatial communication with the connection slots 411. The surrounding wall portion 51 and the partition wall portion 52 cooperatively define a mounting space 54 that is located at the back of the partition wall portion 52, and that is disposed between the receiving seat 5 and the housing portion 41. The surrounding wall portion 51 is formed with two engaging grooves 511 recessed forward and engaged respectively with the front tenon portions 44, and four receiving holes 512. The front plug portions 45 are respectively inserted into the receiving holes 512.

The blocking mechanism 6 includes a pivot shaft 61 that is located in the mounting space 54, that is disposed between the through grooves 53, and that has two opposite ends connected respectively to the receiving seat 5. The blocking mechanism 6 further includes a torsion spring 62 sleeved on the pivot shaft 61, and two cover plates 63 connected pivotally to the pivot shaft 61 and are connected respectively to two opposite ends of the torsion spring 62. As shown in FIG. 4., before use, each of the cover plates 63 is disposed at a blocking position, blocks a respective one of the connection slots 411, and is inclined relative to a central axis 413 of the respective one of the connection slots 411 (also referred to as the incident axis of the light beam) with a free end of the each of the cover plates 63 that is distal from the pivot shaft 61 being more towards the rear than the pivot shaft 61, and with an angle (D) that is defined between the each of the cover plates 63 and the central axis 413 of the respective one of the connection slots 411 being not a right angle. Specifically, the angle (D) ranges from 40 degrees to 44 degrees, which produces a reflection angle (E) of a light beam ranging between 92 degrees and 100 degrees. In this embodiment, the angle (D) is 42 degrees, which means that the reflection angle (E) is 96 degrees. The cover plates 63 may be made of plastic or other material of various colors, and with antistatic material applied to outer surfaces thereof. Each of the cover plates 63 includes two hinged connections 631 sleeved on the pivot shaft 61 and spaced apart in the up-down direction (C), and a plate body 632 connected to the hinged connections 631 and formed with a recess 633 that is engaged with a respective one of the opposite legs of the torsion spring 62.

Figure 7:
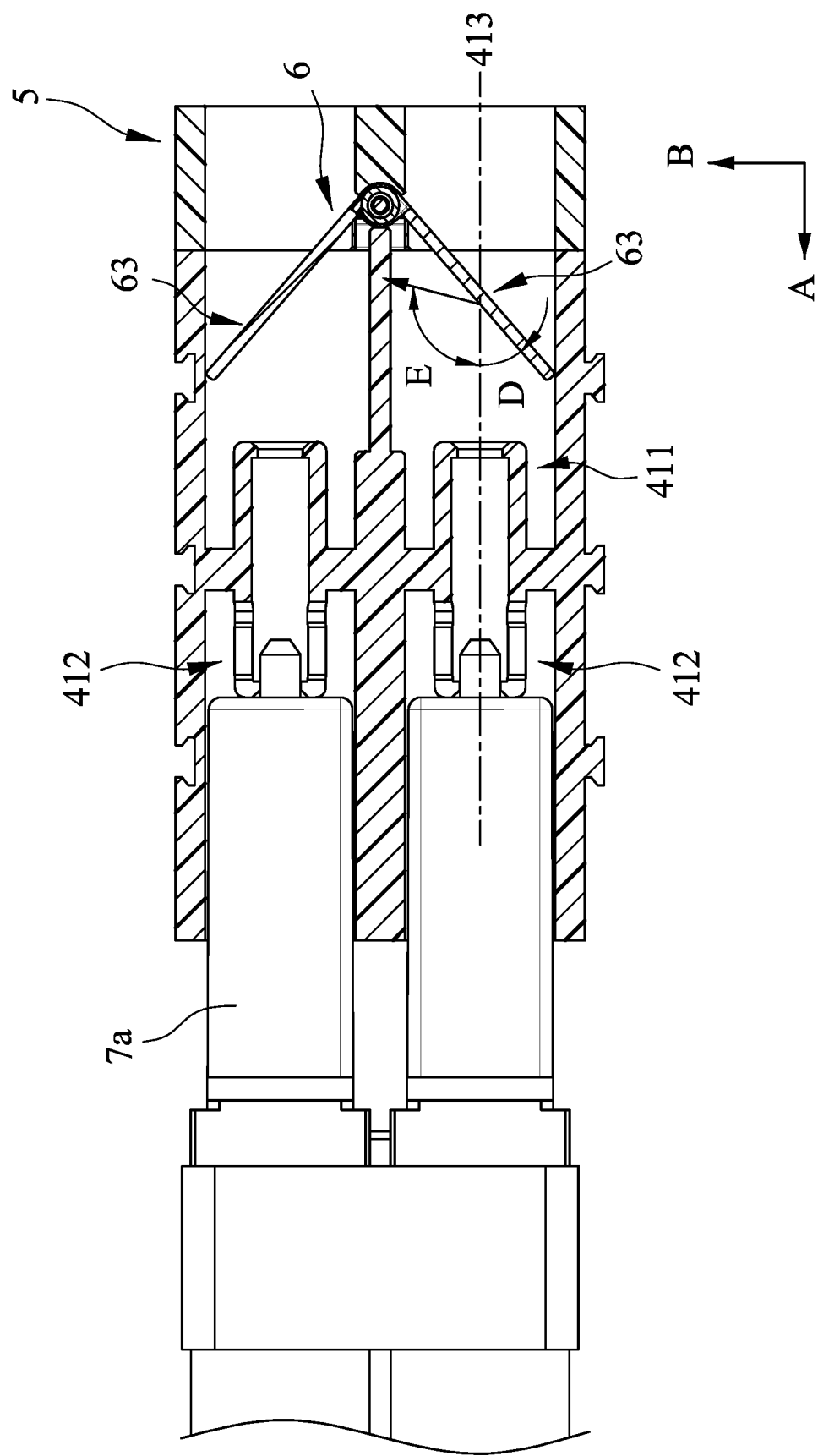
FIGS. 7 to 9 are sectional top views illustrating the embodiment in a manner of use.

Referring to FIGS. 5, 6, and 7, the manner of use of the embodiment is described below. A fiber optic connector 7a has already been inserted into corresponding connection areas 412 of the connection slots 411 that are disposed at the rear end of the fiber optic adapter 3 and that are not provided with the blocking mechanism 6. Each cover plate 63 of the blocking mechanism 6 can be pushed aside by a ferrule 71 of a fiber optic connector 7b (see FIG. 8), thereby changing from the blocking position to an open position (see FIG. 9) relative to the receiving seat 5. When the each of the cover plates 63 is at the blocking position, as shown in FIG. 7, the each of the cover plates 63 can effectively block light beams emitted by the fiber optic connector 7a, so that when the user looks at the front end of the fiber optic adapter 3 directly, the eyes won't be injured. Meanwhile the cover plates 63 can also shield the connection slots 411 to achieve the effect of preventing dust entry. More importantly, the light beam emitted from the fiber optic connector 7a hitting the cover plates 63 will be reflected at the reflection angle (E) instead of being reflected along the same light path back into the fiber optic connector 7a, thus facilitating high-resolution communication. The design of applying antistatic material to the outer surfaces of the cover plates 63 can effectively shield the communication from electromagnetic interference.

Figure 8:
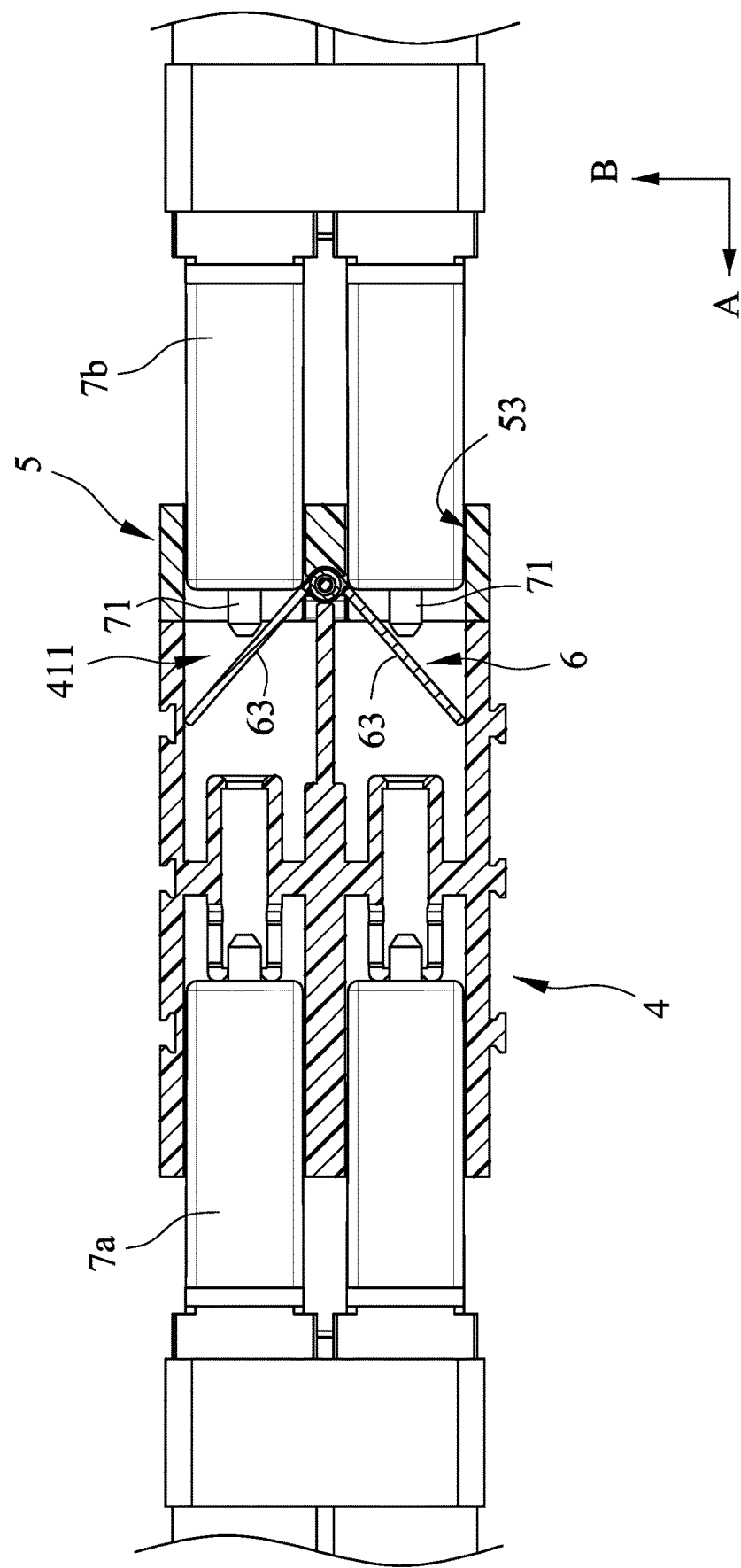
Figure 9:
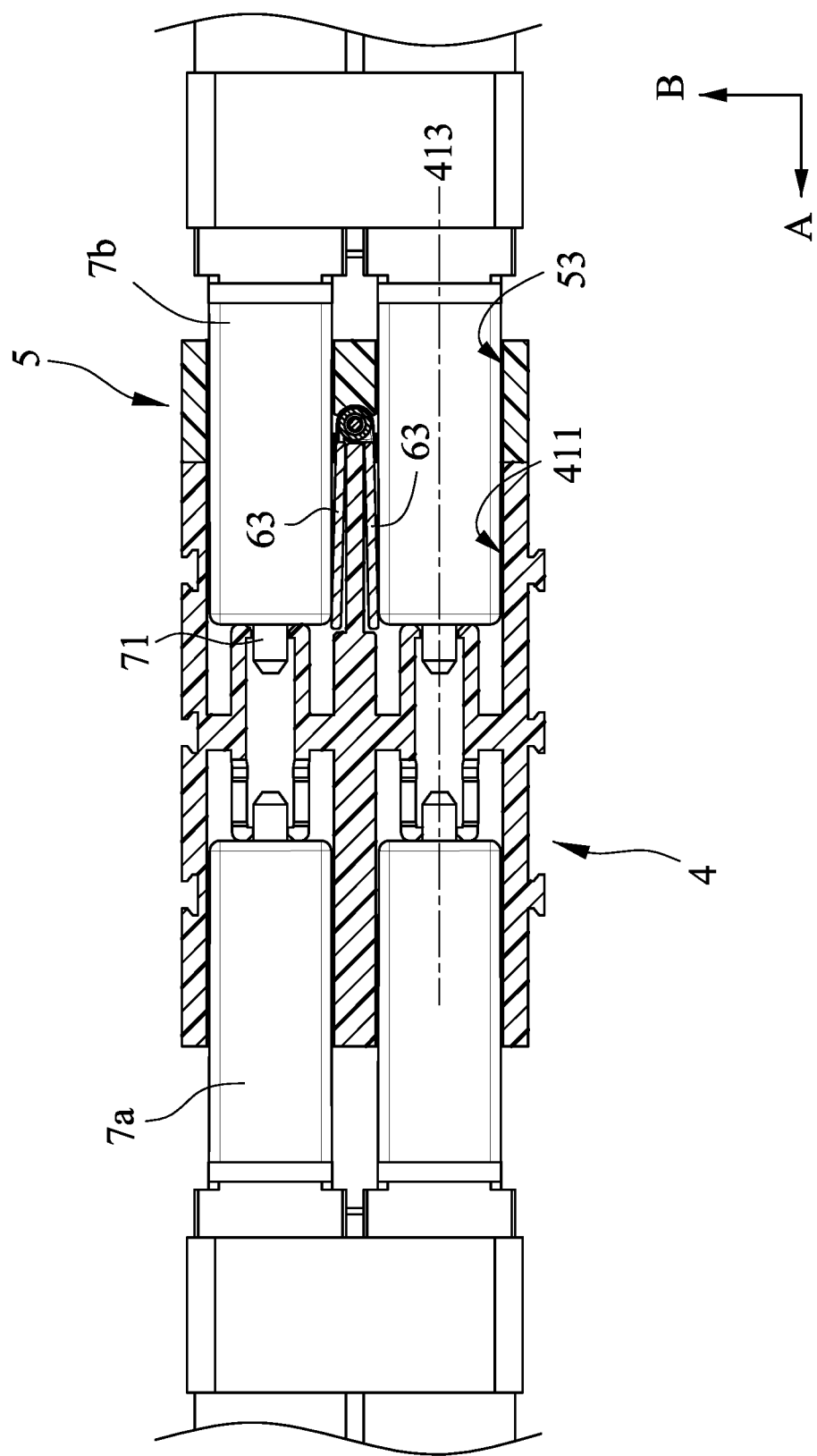

Referring to FIGS. 6, 8, and 9, when another fiber optic connector 7b is inserted from the front end of the fiber optic adapter 3 to push the cover plates 63 to the open position, as shown in FIG. 9, each of the cover plates 63 is pivotally to retract backward and inward to be parallel to the central axis 413 of the respective one of the connection slots 411. At this time, the cover plates 63 are pushed aside to unblock the connection slots 411 and to allow insertion of the fiber optic connector 7b into the connection slots 411 via the through grooves 53 to couple with the fiber optic connector 7a, and the opposite ends of the torsion spring 62 are pushed toward each other by the cover plates 63 to accumulate a resilient force, which can be released to drive the cover plates 63 back to the blocking position when the fiber optic connector 7b is removed. The configuration of the cover plates 63 can prevent the problem of metal fatigue and breakage from occurring due to repeated bending of the conventional metal sheets. Furthermore, the detachable receiving seat 5 is assembled to the outer housing 4 through the front tenon portions 44 and the front plug portions 45, and can be quickly detached, together with the blocking mechanism 6, from the outer housing 4. Besides facilitating easy maintenance, such a design also provides different markings for different applications by quickly replacing the cover plate 63 of different colors, thereby enhancing universality and convenience.

Figure 10:
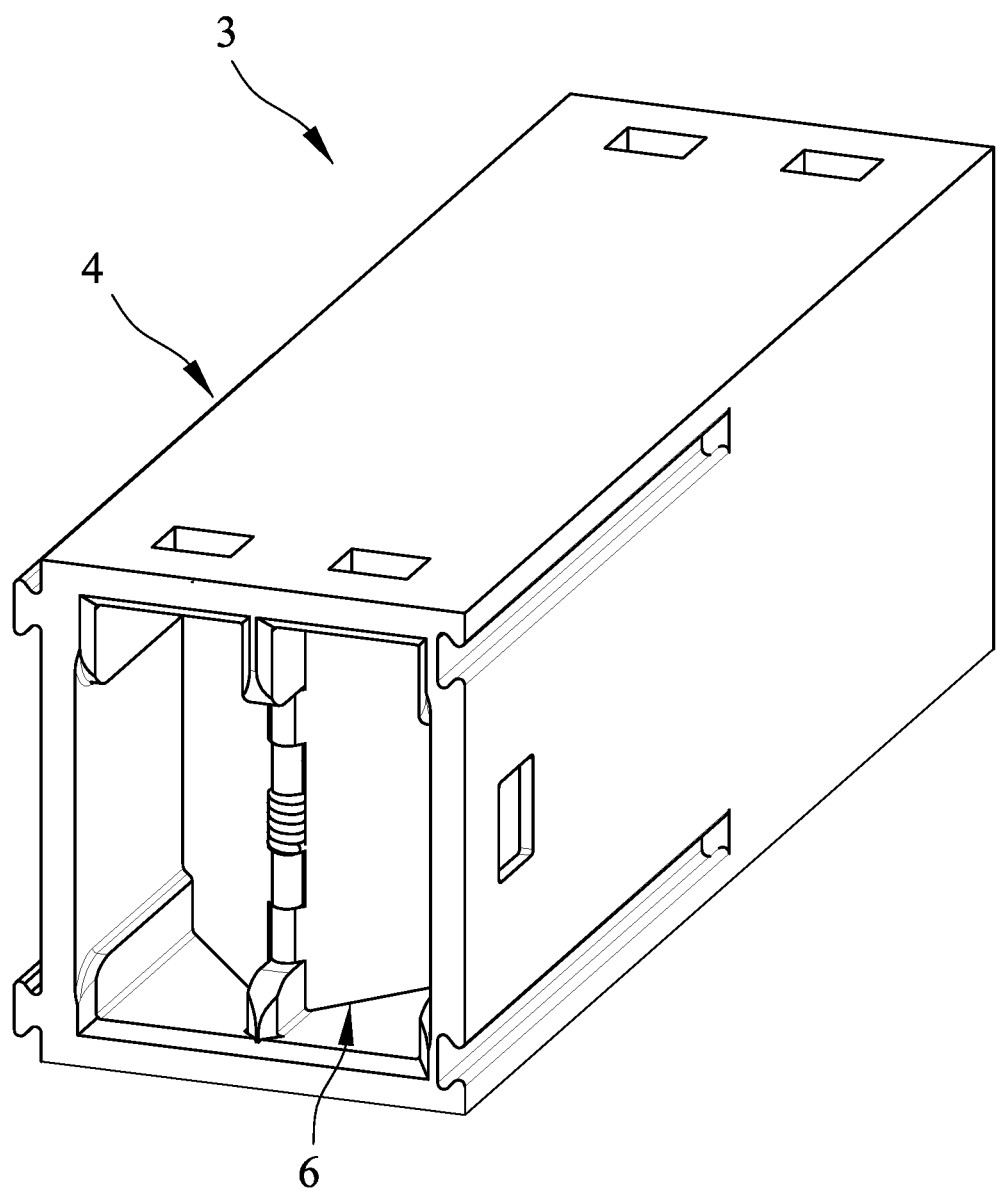
FIG. 10 is a perspective view, illustrating a variation of the embodiment.

It should be particularly noted that, the fiber optic adapter 3 may also be applied to an LC adapter for Lucent connectors. Although the LC adapter needs to be formed with fastening hole at two ends thereof, in this embodiment, the outer housing 4 has to be formed with fastening holes (F) (see FIG. 6) only at one end thereof since the opposite end of the outer housing 4 is configured to be coupled to the receiving seat 5. Since the end of the outer housing 4 formed with the fastening holes (F) is generally disposed in the casing or chassis, it needs not worry about dust ingress. On the other hand the opposite end of the receiving seat 5 is generally exposed outward, its design without the fastening holes (F) can further increase the dustproof effect. Referring to FIG. 10, moreover, the fiber optic adapter 3 may also be applied to an adapter specification as shown in FIG. 10.

In summary, through the inclined configuration of the cover plates 63, the present disclosure can be operated without manually opening the cover plates 63, and has high durability and reliability. In addition to blocking light for enhanced safety, the cover plates 63 can also serve excellent dustproofing functions, and can allow light beams to be reflected at the reflection angle (E), thus the reflected light beams will deviate from the original light path without returning to the original optical fibers, thereby achieving the object of the present disclosure.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A fiber optic adapter comprising:
an outer housing defining two connection slots that extend in a front-rear direction, and that are parallel to and spaced apart from each other;
a receiving seat connected detachably to a front end of said outer housing, and defining two through grooves that are respectively in spatial communication with said connection slots; and
a blocking mechanism mounted on said receiving seat, and including a pivot shaft that is mounted on said receiving seat and between said through grooves, a torsion spring that is sleeved on said pivot shaft, and two cover plates that are connected pivotally to said pivot shaft and that are respectively connected to two opposite legs of said torsion spring, each of said cover plates being pivotable about said pivot shaft against a resilient force of said torsion spring from a blocking position to an open position relative to the receiving seat;
wherein, when each of said cover plates is in the blocking position, said each of said cover plates blocks a respective one of said connection slots, and is inclined relative to a central axis of the respective one of said connection slots with a free end of said each of said cover plates that is distal from said pivot shaft being more towards the rear than said pivot shaft, and with an angle that is defined between said each of said cover plates and the central axis being not a right angle;
wherein, when each of said cover plates is in the open position, said each of said cover plates is retracted backward and inward to be parallel to the central axis of the respective one of said connection slots and unblocks the respective one of said connection slots;
wherein each of said cover plates of said blocking mechanism includes two hinged connections sleeved on said pivot shaft and spaced apart from each other, and a plate body connected to the hinged connections and having a recess that is engaged with a respective one of said opposite legs of said torsion spring;
wherein, when each of said cover plates is in the blocking position, said free end of said each of said cover plates is distal from said free end of another one of said cover plates; and wherein, when each of said cover plates is in the open position, said free end of said each of said cover plates is proximate to said free end of said another one of said cover plates.

2. The fiber optic adapter as claimed in claim 1, wherein, when said each of said cover plates is in the blocking position, the angle between each of said cover plates of the blocking mechanism and the central axis of the respective one of said connection slots ranges from 40 degrees to 44 degrees.

3. The fiber optic adapter as claimed in claim 1, wherein said receiving seat includes a surrounding wall portion, and a partition wall portion disposed in said surrounding wall portion, a space that is surrounded by said surrounding wall portion being divided into said through grooves by said partition wall portion, the surrounding wall portion and the partition wall portion cooperatively defining a mounting space that is located at the back of said partition wall portion, said pivot shaft of said blocking mechanism being located in said mounting space.

4. The fiber optic adapter as claimed in claim 1, wherein said outer housing includes a housing portion that defines said connection slots, and a plurality of front tenon portions protruding forward from a front end of said housing portion, said receiving seat being formed with a plurality of engaging grooves that are engaged respectively with said front tenon portions.

5. The fiber optic adapter as claimed in claim 1, wherein the outer housing includes a housing portion that defines said connection slots, and a plurality of front plug portions protruding forward from a front end of said housing portion, said receiving seat being formed with a plurality of receiving holes, said front plug portions being respectively inserted into said receiving holes.

6. The fiber optic adapter as claimed in claim 1, wherein:
said outer housing includes
a housing portion that extends in the front-rear direction and that has opposite lateral sides in a horizontal direction perpendicular to the front-rear direction, and
a plurality of lateral tenon portions that protrude from one of said lateral sides of said housing portion, and that are spaced apart from each other in the front-rear direction, each of said lateral tenon portions being elongated in an up-down direction that is perpendicular to the front-rear direction and the horizontal direction; and
said housing portion is formed with a plurality of lateral mortise portions at the other one of said lateral sides, said lateral mortise portions being spaced apart from each other in the front-rear direction, each of said lateral mortise portions being elongated in the up-down direction.

7. The fiber optic adapter as claimed in claim 1, wherein outer surfaces of said cover plates of said blocking mechanism are applied with antistatic material.

\* \* \* \* \*